Aug. 31, 1954  A. J. JOHNSON  2,687,866
TRIPOD
Filed Sept. 25, 1951  2 Sheets-Sheet 1

INVENTOR.
Aberth J. Johnson
BY
Popp and Sommer
ATTORNEYS.

Aug. 31, 1954
A. J. JOHNSON
2,687,866
TRIPOD
Filed Sept. 25, 1951
2 Sheets-Sheet 2
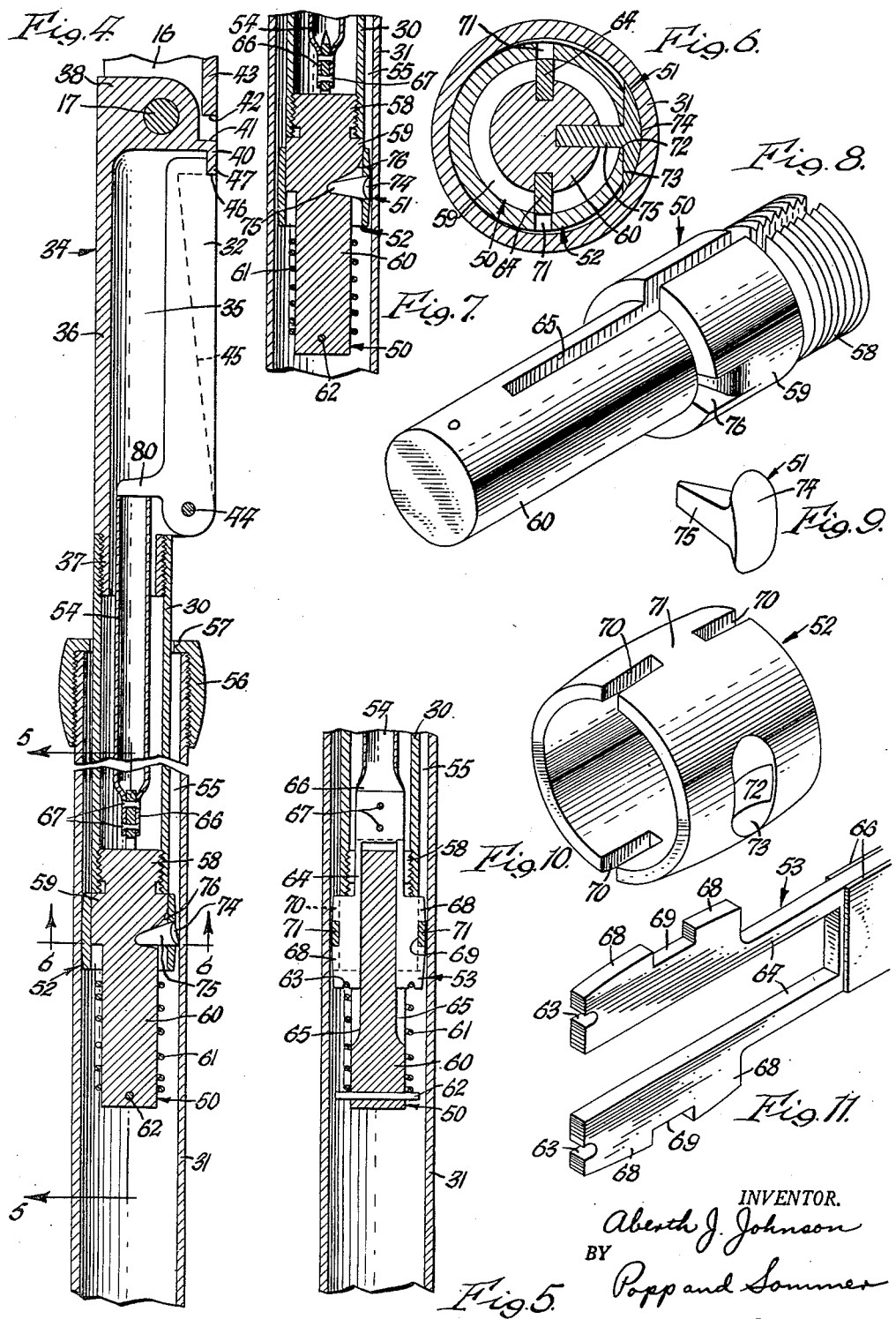
INVENTOR.
Aberth J. Johnson
BY
Popp and Sommer
ATTORNEYS.

Patented Aug. 31, 1954

2,687,866

UNITED STATES PATENT OFFICE 2,687,866

TRIPOD

Aberth J. Johnson, Buffalo, N. Y.

Application September 25, 1951, Serial No. 248,248

6 Claims. (Cl. 248—168)

This invention relates to improvements in a tripod for supporting a photographic camera or similar instrument, and more particularly to the extensible leg structure of such a tripod.

Tripods of this character having extensible legs in the form of telescopic tubes are of course not new. However, such prior devices have not proven fully satisfactory principally because the mechanism for locking the leg tubes in any adjusted position when setting up the tripod, required manipulation of some part which was located far down the leg. This was relatively tedious and laborious since adjustment of the length of each leg required the operator to stoop or bend over and furthermore each leg had to be adjusted individually. Inasmuch as it is desirable to have the head or part joining the convergent upper ends of the legs level in most tripod set ups, considerable final adjusting of the effective lengths of the legs was required with the prior devices in order to achieve this level condition of the tripod head.

It is accordingly the principal object of the present invention to provide a camera tripod or the like having extensible legs which can be readily set up and the legs adjusted as to length in an exceedingly easy and rapid manner without requiring the operator to stoop or bend over, and also permitting the tripod to be collapsed with equal facility and quickness.

A further object is to provide such a tripod in which the relatively extensible leg tubes are securely maintained in any extended position once the adjustment is made.

Another object is to provide such a tripod which is simple, lightweight and durable in construction, not likely to get out of order or require repairs, and easy and inexpensive to manufacture.

Other objects and advantages of the invention will be apparent from the following description and accompanying drawings wherein Fig. 1 shows a tripod embodying the present invention set up or emplaced on irregular ground.

Fig. 4 is a still further enlarged fragmentary vertical sectional view of one of the tripod legs and showing the leg locking mechanism in a locked operative condition.

Fig. 5 is a fragmentary sectional view of the locking mechanism shown in the lower part of Fig. 4, taken on line 5—5 thereof.

Fig. 6 is an enlarged horizontal sectional view, taken on line 6—6, Fig. 4.

Fig. 7 is a fragmentary view similar to Fig. 4 but showing the locking mechanism in an unlocked inoperative condition.

Figs. 8–11 are enlarged perspective views of some of the parts of the leg locking mechanism.

The invention is illustrated as embodied in a tripod for supporting a photographic camera although it is to be understood that the invention is not limited to this use.

Figure 2:
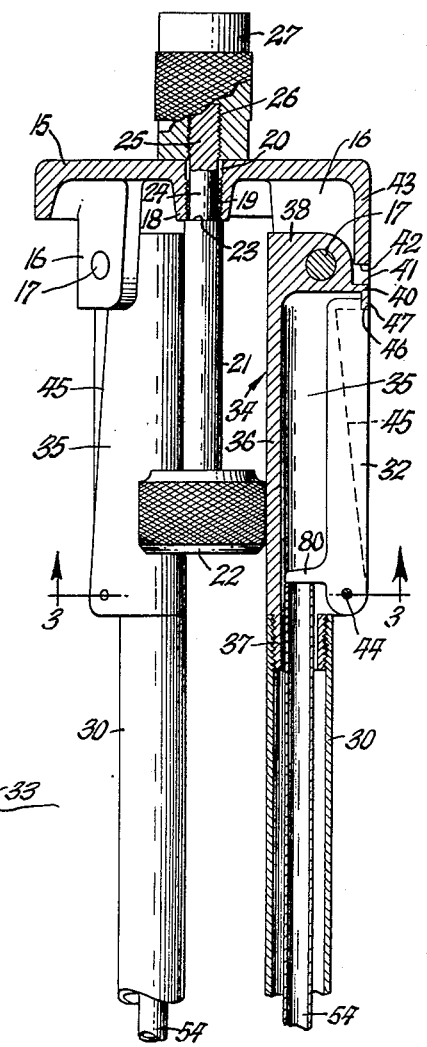
Fig. 2 is an enlarged fragmentary view, partly in vertical section, of the upper part of the tripod shown in Fig. 1 but representing the legs in an unspread or folded in position.
Figure 3:
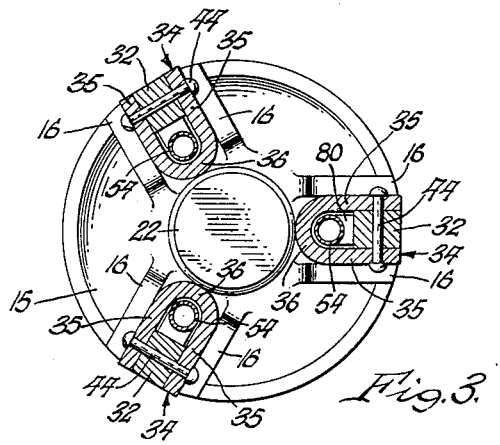
Fig. 3 is a horizontal sectional view thereof, taken on line 3—3, Fig. 2.

As shown, the tripod comprises three legs connected at their upper ends to a head assembly. The latter comprises a horizontally arranged circular head plate 15 having three pairs of spaced flat ears 16 depending from its underside adjacent the periphery thereof. The pairs of ears 16 are grouped circumferentially equal distances apart and extend radially as shown in Fig. 3 so as to form trunnion blocks between which the upper ends of the corresponding legs are arranged and on which the legs are pivotally mounted as by the pivot pins 17. The central part of the head plate 15 is provided with a depending annular boss 18 having an internally threaded bore 19 which at its upper end communicates with an unthreaded hole 20 in the plate. The bore 19 and registering hole 20 receive an elongated bolt member 21 having an enlarged head 22 at its lower end, preferably knurled, and having its upper end portion or reduced diameter so as to provide the upwardly facing shoulder 23 adapted to engage the lower end face of the boss 18 as shown in Fig. 2. The reduced upper end portion of the bolt member 21 has two parts, an inner cylindrical unthreaded part 24 and an outer externally threaded part 25. The threads of the outer part 25 are adapted to screw through the internal threads of the bore 19 so that the inner part 24, which has a diameter smaller than the bore 19, can enter this bore. The outer threaded part 25 normally is received in an internally threaded recess 26 in a nut member 27 arranged above the head plate 15 with its lower end face adapted to engage the upper face of the head plate so that tightening of the bolt and nut members will tend to clamp the head plate therebetween. The nut member 27 is for the purpose of mounting the camera (not shown) or other instrument on the tripod and may be of any suitable form. When it is desired to change the nut member 27 for one of a different type or to change its angular position relative to the head plate 15, this can be done readily by loosening the bolt member 21. If the nut member 27 is completely disengaged from the bolt member 21, it will be seen that the bolt member cannot drop off the head plate 15 since the lowermost thread of the part 25 will catch on the uppermost thread in the bore 19. However, if it is desired to remove the bolt member from the head plate 15, the part 25 can be unscrewed through the threaded bore 19.

The three legs shown are identical with one another and hence a detailed description of one will be sufficient. Each leg comprises an upper inner tube 30 telescopically arranged in a lower outer tube 31 and a locking mechanism for preventing relative axial movement between the tubes but permitting a change in relative axial position of the tubes upon manipulation of a lever 32 arranged at the upper end of the upper inner tube 30. The lower end of each outer tube may be closed by a plug 33 formed to provide an external spike for preventing the leg from slipping on the ground or other surface supporting the tripod.

In order to mount the lever 32 on the leg and also to mount the leg on the head assembly, each leg is provided with an adapter 34. This adapter is shown as being in the form of an integral member having an intermediate U-shaped body portion including spaced side walls 35—35 connected by a curved web 36, externally threaded tubular neck 37 extending from the lower end of the U-shaped body portion, and a solid head portion 38 at the opposite end thereof. The head portion 38 has flat opposite side surfaces to fit between the inner opposing surfaces of the corresponding pair of attaching ears 16 and is also provided with a transverse hole which receives the corresponding pivot pin 17.

To limit the extent to which any leg can be swung or spread outwardly, the head portion 38 of each adapter 34 is formed on its outer side with an extension 40 providing an upwardly facing stop surface 41 adapted to engage the lower edge 42 of a vertical web 43 extending across the space between each pair of attaching ears 16 at the outer ends thereof, as best shown in Fig. 2.

The neck 37 of the adapter 34 is screwed into the upper end of the upper and inner leg tube 30 which is internally threaded for this purpose. The external surface of the curved web 36 is preferably concentric with the outer periphery of the tube 30 and forms a continuation thereof.

The lever 32 is arranged between the spaced side walls 35 of the adapter 34. This lever is in the form of a vertically elongated bar pivoted on the lower outwardly extending ends of the side walls 35 by a pivot pin 44 which extends through a transverse hole in the lever 32 and the ends of this pin are received in registering holes in the side walls 35, as best shown in Fig. 3. It will be noted that the outer edges of the side walls 35 taper upwardly and inwardly, as indicated at 45, so as to expose the upper outer portion of the lever 32. To limit pivotal movement of the lever 32 to its outermost position shown in Fig. 2, the upper end of the lever 32 is provided with a notch 46 at its outer corner which engages with a lip 47 depending from the outer end of the extension 40 on the adapter 34. The lever 32 is so arranged that sufficient clearance exists between the inner side of this lever and the inner surface of the web 36 to permit the lever to swing counterclockwise about its pivot as shown in Fig. 2.

When the upper end of the lever 32 is so depressed into the adapter 34, this operates to release a locking mechanism which normally holds the leg tubes 30 and 31 against relative axial movement. This locking mechanism is illustrated in Figs. 4–11 and will now be described.

In general, this locking mechanism comprises a plug 50 (Fig. 8), a shoe member 51 (Fig. 9), a sleeve 52 (Fig. 10), a carrier 53 (Fig. 11), and a push rod 54 (Fig. 4).

The leg tubes 30 and 31 are preferably cylindrical in cross section and are also preferably of sufficiently different diameters such that an annular space 55 is provided between the opposing surfaces of the inner and outer tubes 30 and 31 respectively, as shown in Fig. 4. To maintain this spacing of these tubes, a cap 56 is screwed on the upper end of the outer tube 31 and has a central opening 57 through which the inner tube 30 slidably extends, as shown in Fig. 4.

The plug 50 is connected to the lower end of the inner tube 30 and for this purpose the plug has an externally threaded neck 58 which screws into the internally threaded end of this tube. The portion of the plug 50 immediately below its neck 58 is cylindrical and enlarged as indicated at 59 so that its periphery is coextensive with the periphery of the tube 30. The lower portion of the plug is formed to provide a stem 60 which projects downwardly and centrally from the intermediate body portion 59 and serves as a guide for a helical compression spring 61 which surrounds this stem. The spring 61 is retained on this stem 60 by a pin 62 which extends through a transverse hole in the lower part of the stem.

The uppermost convolution of the spring 61 is received in notches 63—63 provided in the free end faces of the arms 64—64 of the carrier 53 which is in the form of a bifurcated plate. The arms 64 are slidably arranged in grooves 65—65 which extend longitudinally of the plug 50 on diametrically opposite sides thereof, these grooves beginning short of the extremity of the stem 60 and extending through the intermediate body portion 59 and neck 58 of the plug. The joined or upper ends of the arms 64 of the bifurcated carrier 53 may be connected to the lower end of the push rod 54 in any suitable manner, and as shown this push rod is a hollow tube flattened at its lower end and split to provide hand portions 66 which embrace the carrier 53 and are secured thereto as by the rivets 67.

Thus far it will be seen that the push rod 54 which is arranged axially within the inner tube 30 can be moved downwardly to slide the carrier 53 on the plug 50 against the urging of the spring 61.

The sleeve 52 is mounted on the carrier 53 so as to move therewith. To accomplish this, each of the arms 64 of the carrier is provided with a pair of outwardly projecting lugs 68—68 spaced from each other longitudinally thereof to provide a notch 69 therebetween. The sleeve 52 is in the form of a relatively short cylindrical tube having a pair of notches 70—70 on one side and a similar pair of notches in a diametrically opposite position. The notches 70 on each side are axially in line with each other and each opens to the corresponding end face of the sleeve 52. These notches 70 receive the corresponding lugs 68 on the bifurcated carrier 53 with the notches 69 on the latter also receiving the web portions 71 connecting the bases of the corresponding pair of notches 70 on the sleeve 52. To mount the sleeve 52 on the carrier 53, the arms 64 of the carrier are flexed toward each other to permit the sleeve to be slipped over these arms which are thereupon released thereby permitting the lugs 68 to interfit with the notches 70. It will be noted that the outer faces of the lugs 68 and the periphery of the sleeve 52 are coextensive and preferably rounded so that these outer surfaces are slightly convex in longitudinal section.

On one side intermediate the pairs of notches 70, the sleeve 52 has a hole 72 which is countersunk to provide a bearing surface 73. The concavity of this bearing surface 73 is such that it may be considered generally semi-cylindrical and having an axis extending tangentially to the periphery of the sleeve 52.

The shoe member 51 is generally T-shaped having a head 74 and a rock arm 75. The head 74 seats on the bearing surface 73 and the rock arm 75 projects through the hole 72 in the sleeve 52. The inner surface of the head 74 is convex corresponding to the concavity of the bearing surface 73 so that the head is rockably pivoted on the bearing surface to swing the rock arm in a plane extending longitudinally of the sleeve. The outer surface of the head 74 is coextensive with the periphery of the sleeve 52 when the shoe member 51 is in a centered position, as shown in Fig. 7.

The free end portion of the rock arm 75 of the shoe member 51 is received in a recess 76 provided in the plug 50, such recess being located in the intermediate body portion 59 of the plug adjacent its juncture with the upper end of the stem 60. This recess 76 enlarges outwardly toward its mouth. In this manner the extremity of the rock arm 75 is held against axial movement relative to the plug 50 but permits this rock arm to swing to rock the shoe member 51 on its seat 73.

In assembling the locking mechanism, the sleeve 52 is mounted on the bifurcated carrier 53 as previously described. Thereafter the arms 64 of the carrier are inserted into the grooves 65 in the plug 50 at the neck end thereof. When the hole 72 in the sleeve 52 is opposite the recess 76 in the plug the shoe member 51 is inserted. The spring 61 is placed over the stem 60 and compressed sufficiently to permit insertion of the retaining pin 62. The push rod 54 is then inserted into the inner tube 30 through the lower end thereof and the plug 50 is screwed to the tube by means of the neck 58.

The push rod is of such length that when the plug 50 is so fastened to the inner tube 30, the upper end of the push rod engages the arm 80 on the lever 32 so as to push this lever to its extreme outward position, this being determined by the notch 46 engaging the stop lip 47.

Thereafter the lower end of the inner tube 30 with the locking mechanism mounted thereon is inserted into the open upper end of the outer tube 31, the cap 56 having been removed for this purpose. When so inserting the inner tube into the outer tube, the lever 32 is depressed so as to center the shoe member 51 on its seat 73 as more fully described hereinafter. After the tubes are telescoped, the cap 56 is screwed onto the upper end of the outer tube 31.

The operative position of the locking mechanism is shown in Fig. 4 in which it will be seen that the spring 61 urges the sleeve 52 upwardly relative to the intermediate body portion 59 of the plug 50 on which portion the sleeve is slidable so as to tilt or rock the shoe member 51 in a counterclockwise direction as viewed in Fig. 4, relative to its seat 73 thereby projecting the lower edge portion of the working face of the head 74 of the shoe member outwardly beyond the periphery of the sleeve 52. As best shown in Fig. 6, the lower portion of the working face of the shoe member 51 engages the inner surface of the outer tube 31 and this urges the diametrically opposite face portion of the sleeve 52 into engagement with the opposing inner surface portion of the outer tube. The engagements of the shoe member 51 and the sleeve 52 with the outer tube 31 are frictional. It will be seen that by reason of the tipped position of the shoe member 51, the harder the inner tube 30 is urged to move into the outer tube 31, the firmer the frictional clutching action of the locking mechanism. Thus the legs of the tripod will not tend to shorten once adjusted to the desired effective length.

Now if it is desired to adjust the relative axial position of the inner and outer tubes 30 and 31 respectively of any leg, it is merely necessary to depress the corresponding lever 32. When this is done the locking mechanism assumes the inoperative condition shown in Fig. 7. Depressing the lever 32 swings the arm 80 thereon downwardly and this pushes the push rod 54 downwardly. Since the sleeve 52 is mounted on the push rod 54 through the carrier 53, the sleeve slides downwardly relative to the plug 50, this plug not being able to move because of its connection to the inner tube 30. This relative axial movement between the sleeve 52 and plug 50, shifts the seat 73 relative to the bottom of the recess 76 and thereby rocks the shoe member 51 to bring the working face of its head 74 into flush relation with the periphery of the sleeve 52. With the shoe member 51 so centered the leg tubes 30 and 31 can be adjusted to any relative axial position desired and by releasing the lever 32, the adjustment can be retained or secured. When the lever 32 is released the locking mechanism returns from the inoperative position shown in Fig. 7 to the operative locking position shown in Fig. 4.

Figure 1:
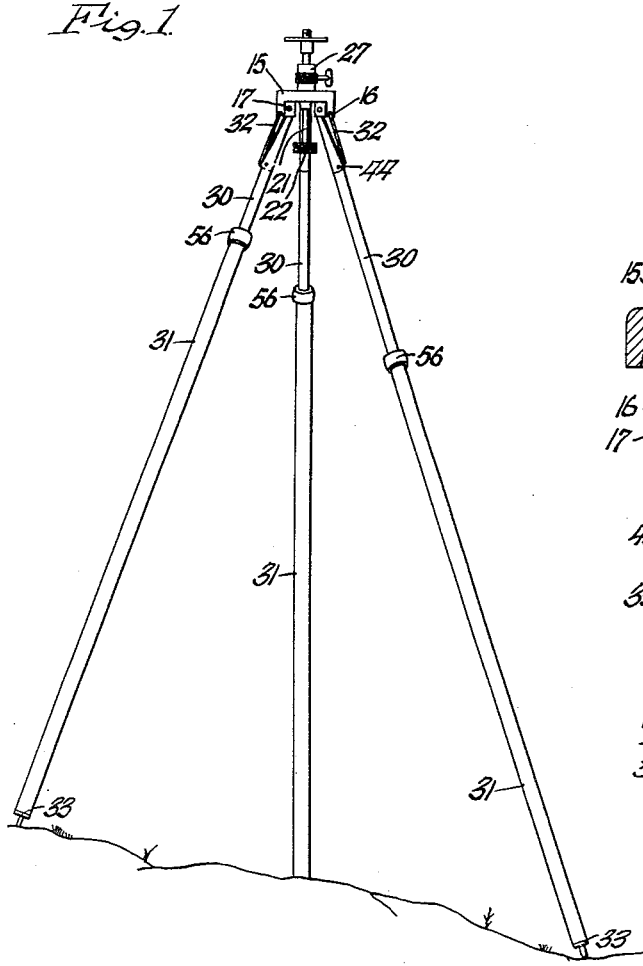

An important feature of the invention is the disposition of the locking mechanism manipulating devices, namely, the levers 32, at the upper ends of the legs immediately under the head of the tripod. The effective length of any or all legs can be individually or simultaneously adjusted by depressing the appropriate levers 32. The tripod set up on uneven ground and with each of the legs having different effective or overall lengths, is illustrated in Fig. 1. In the position there illustrated, the head of the tripod is level but this head can be tilted, raised or lowered by depressing the appropriate lever 32 to change the length of the leg or legs desired.

The tripod is usually carried in a collapsed condition, that is, with the legs at their shortest length and with these legs folded inwardly so as to be generally parallel with one another. When setting up the tripod, the same can be grasped by placing the operator's hand or hands around the legs immediately below the head and holding the head at about the level desired for the same when the tripod is finally emplaced or set up. Thereafter the various levers 32 are depressed, this being accomplished by squeezing these levers inwardly. While this is done, it will be noted that the adapters 34 engage the head 22 of the bolt member 21. Thus a firm backing is provided when depressing the levers 32. When the levers 32 are so depressed, the locking mechanisms in the various legs are released which permits the lower and outer tubes 31 to drop by gravity until their lower ends strike the ground. Thereafter these legs are swung outwardly or spread about their pivots 17 until the surfaces 41 and 42 engage. Any final adjustments desired can be made by manipulating the appropriate lever 32 for the leg which is desired to be either lengthened or shortened.

It will be seen that in emplacing or setting up the tripod, the operator is not required to stoop or bend over in order to adjust the length of the legs of the tripod. The emplacement is rapid and easy.

Likewise, when collapsing the tripod, the operator need merely fold the legs inwardly toward one another and thereafter place his hand or hands around the levers 32 and depress the same and thereafter push downwardly on the tripod. The head 22 of the bolt member 21 again provides a backing for the legs when depressing the levers 32. This will cause the upper and inner tubes 30 to slide into the lower and outer tubes 31. Thus the tripod can be quickly and easily collapsed to compact form for carrying.

From the foregoing it will be seen that the present invention provides an improved tripod for cameras and the like and which has the advantages of being quickly and easily set up and also collapsed and which is exceedingly convenient to use.

I claim:

1. A tripod comprising a head part, extensible legs, means connecting the upper ends of said legs to said head part at circumferentially spaced substantially equidistant intervals for pivotal movement about tangential axes, each of said legs comprising telescopic leg tubes, a releasable internal locking mechanism arranged to prevent relative axial movement between said tubes and a manually operable member movably mounted on the upper end of the leg on the outer side thereof and operatively associated with said locking mechanism and arranged for operative movement transversely of the leg and inwardly thereof to release said locking mechanism, and an abutment on said head part arranged below said tangential axes and between said legs and engageable with their inner sides when said legs are generally parallel with one another to prevent said legs from moving past such parallel relation and also to provide a backing for said legs during the operative manipulation of said members which are adapted to be embraced simultaneously by the operator's hand and thereby operatively moved to release simultaneously the said locking mechanisms in said legs for adjustment of the effective lengths thereof.

2. A tripod comprising a head part, extensible legs, means connecting the upper ends of said legs to said head part at circumferentially spaced substantially equidistant intervals for pivotal movement about tangential axes, each of said legs comprising telescopic leg tubes, a releasable internal locking mechanism arranged to prevent relative axial movement between said tubes, and a lever arranged at the upper end of the leg on the outer side thereof for pivotal movement about an axis generally parallel to the corresponding pivotal axis for the leg and operatively associated with said locking mechanism whereby manual depression of said lever inwardly of the leg operates to release said locking mechanism, and an elongated bolt member mounted on said head part and having an enlarged head arranged below said tangential axes and between said legs and engageable with their inner sides when said legs are generally parallel with one another to prevent said legs from moving past such parallel relation and also to provide a backing for said legs during the depression of said levers which are adapted to be embraced simultaneously by the operator's hand and thereby operatively moved to release simultaneously the said locking mechanisms in said legs for adjustment of the effective lengths thereof.

3. In a tripod, an extensible leg structure comprising an outer tube, an inner tube telescopically arranged in said outer tube, and a releasable internal locking mechanism to prevent relative axial movement between said tubes and comprising a sleeve arranged at the inner end of said inner tube for sliding movement axially thereof and having a periphery opposing the inner surface of said outer tube and also having a concave recess in said periphery providing a bearing surface, a shoe member rockably seated on said bearing surface and having an outer working face flush with said periphery when said shoe member is centered on said bearing surface, a rock arm on said shoe member projecting inwardly therefrom through a hole in said sleeve, means holding the inner extremity of said rock arm axially immovable relative to said inner tube although permitting said rock arm to swing in a plane extending axially of said inner tube, spring means operatively interposed between said inner tube and sleeve to urge constantly the latter to move axially relative to the former to cause said shoe member to pivot on said bearing surface and thrust its said working face into frictional clutching engagement with said inner surface of said outer tube, an elongated push rod arranged axially within a said inner tube and connected to said sleeve and manually operable to shift the axial position of said sleeve relative to said inner tube against the opposition of said spring means and thereby effect a release of the clutching action of said shoe member.

4. In a tripod, an extensible leg structure comprising an outer tube, an inner tube telescopically arranged in said outer tube, and a releasable internal locking mechanism to prevent relative axial movement between said tubes and comprising a plug on the inner end of said inner tube, a sleeve slidably arranged on said plug and having a periphery closely opposing the inner surface of said outer tube and also having a generally semi-cylindrical concave recess in said periphery providing a bearing surface, the axis of said bearing surface extending tangentially to said periphery, a shoe member having a convex inner surface seated on said bearing surface and an outer working face flush with said periphery when said shoe member is centered on said bearing surface, a rock arm on said shoe member projecting inwardly from said inner convex surface thereof through a hole in said sleeve, the free end portion of said rock arm being received in a recess in said plug whereby a shift in the relative axial positions of said sleeve and plug will cause said shoe member to rock on said bearing surface, spring means operatively interposed between said inner tube and sleeve and arranged to urge constantly such axial shift between said sleeve and plug whereby said working face of said shoe member is thrust into frictional clutching engagement with said inner surface of said outer tube, an elongated push rod arranged axially within said inner tube, means connecting the inner end of said push rod with said sleeve, and a manipulating device arranged at the outer end of said push rod for moving the same axially relative to said inner tube and in opposition to said spring means to release the clutching action of said shoe member.

5. In a tripod, an extensible leg structure comprising an outer tube, an inner tube telescopically arranged in said outer tube, and a releasable internal locking mechanism to prevent relative axial movement between said tubes and comprising a plug on the inner end of said inner tube, a sleeve slidably arranged on said plug and having a periphery closely opposing the inner surface of said outer tube and also having a generally semi-cylindrical concave recess in said periphery providing a bearing surface, the axis of said bearing surface extending tangentially to said periphery, a shoe member having a convex inner surface seated on said bearing surface and an outer working face flush with said periphery when said shoe member is centered on said bearing surface, a rock arm on said shoe member projecting inwardly from said inner convex surface thereof through a hole in said sleeve, the free end portion of said rock arm being received in a recess in said plug whereby a shift in the relative axial positions of said sleeve and plug will cause said shoe member to rock on said bearing surface, spring means operatively interposed between said inner tube and sleeve and arranged to urge constantly such axial shift between said sleeve and plug whereby said working face of said shoe member is thrust into frictional clutching engagement with said inner surface of said outer tube, an elongated push rod arranged axially within said inner tube, means connecting the inner end of said push rod with said sleeve and comprising a bifurcated carrier connected to said push rod and having two spaced parallel arms slidably arranged in grooves provided in said plug and lugs projecting laterally outwardly from said arms and interfitting with recesses in said sleeve, and a manipulating device arranged at the outer end of said push rod for moving the same axially relative to said inner tube and in opposition to said spring means to release the clutching action of said shoe member.

6. In a tripod, an extensible leg structure comprising an outer tube, an inner tube telescopically arranged in said outer tube, and a releasable internal locking mechanism to prevent relative axial movement between said tubes and comprising a plug having a neck fitting into the inner open end of said inner tube and connected thereto, an intermediate body portion and a stem projecting axially from said intermediate body portion on the side thereof opposite from said neck, a sleeve surrounding said intermediate body portion and slidable axially thereof and having a periphery in closely spaced relation to the opposing inner surface of said outer tube and also having a generally semi-cylindrical concave recess in said periphery providing a bearing surface the axis of which extends tangentially to said periphery, a shoe member having a convex inner surface rockably seated on said bearing surface and an outer working face flush with said periphery when said shoe member is centered on said bearing surface, a rock arm on said shoe member projecting inwardly from said inner convex surface thereof through a hole in said sleeve, the free end portion of said rock arm being received in a recess in said plug whereby a shift in the relative axial positions of said sleeve and plug causes said shoe member to pivot on said bearing surface and project a portion of its said working face beyond said periphery, a bifurcated carrier having two spaced parallel arms slidably arranged in axially extending grooves in said plug and said arms being connected to said sleeve, a compression spring surrounding said stem and anchored at one end thereto and at its opposite end bearing against the ends of said carrier arms and urging the projected portion of said working face of said shoe member into firm frictional contact with said inner surface of said outer tube, an elongated push rod arranged axially within said inner tube and having its inner end connected with said carrier, and a manipulating device arranged at the outer end of said push rod for moving the same axially relative to said inner tube in opposition to the urging of said spring to effect a return of said shoe member to its said centered position and thereby releasing the locking mechanism.

References Cited in the file of this patent

UNITED STATES PATENTS

| Number | Name | Date |
|---|---|---|
| 373,303 | Patzer | Nov. 15, 1887 |
| 389,577 | Kintz | Sept. 18, 1888 |
| 398,408 | Koehn | Feb. 26, 1889 |
| 403,841 | Homan | May 21, 1889 |
| 510,243 | Deem | Dec. 5, 1893 |
| 769,447 | McKinney | Sept. 6, 1904 |
| 2,290,400 | Wirgin | July 21, 1942 |
| 2,430,649 | Schulz | Nov. 11, 1947 |